Sept. 16, 1969     C. K. CHATTEN ET AL     3,467,047
MINIMUM-WIDTH CONTINUOUSLY FAIRED TOWLINE
Filed Dec. 21, 1967     3 Sheets-Sheet 1

INVENTORS.
SAMUEL H. BEHR
CLARENCE K. CHATTEN
BY Philip Schneider
ATTORNEYS

Sept. 16, 1969　　　C. K. CHATTEN ET AL　　　3,467,047

MINIMUM-WIDTH CONTINUOUSLY FAIRED TOWLINE

Filed Dec. 21, 1967　　　　　　　　　　　　3 Sheets-Sheet 3

INVENTORS.
SAMUEL H. BEHR
CLARENCE K. CHATTEN

BY Philip Schneider

ATTORNEYS

United States Patent Office 3,467,047
Patented Sept. 16, 1969

3,467,047
MINIMUM-WIDTH CONTINUOUSLY
FAIRED TOWLINE
Clarence K. Chatten, Jackson Heights, and Samuel H. Behr, Uniondale, N.Y., assignors to the United States of America as represented by the Secretary of the Navy
Filed Dec. 21, 1967, Ser. No. 693,695
Int. Cl. B63b 21/56
U.S. Cl. 114—235                               3 Claims

ABSTRACT OF THE DISCLOSURE

A towline comprising a continuous fairing, a tension line, one or more communication modules comprising stretchable electrical wires enclosed in resilient insulation, a continuous fairing spacer, a plurality of nose pieces, yokes and restraining rings. The fairing is formed with a longitudinal internal cavity in which the communication modules are inserted. The cavity is connected to the head of the fairing by a passageway in which the fairing spacer is inserted. The tension line is placed against the outer surface of the spacer and the nose pieces are fitted over this assembly enclosing the tension line and are bolted to the fairing before and behind the communication modules. Yoke pieces and their associated restraining rings are substituted for nose pieces at intervals along the towline.

---

The invention described herein may be manufactured and used by or for the Government of the United States of America for governmental purposes without the payment of any royalties thereon or therefor.

This invention relates to marine towlines and especially to faired towlines which contain electrical cables.

In the detection of vessels by means of sonar equipment, it has been found that the noise of the vessel which carries the sonar equipment interferes with the reception of sonar echoes. Accordingly, the sonar antenna and pre-amplifying equipment may be enclosed in a container and towed underwater behind the vessel. Originally, the towline consisted of armored cable. However, the stresses caused by increase in the size and weight of the towed "fish" and increase in speed of the towing vessel impel an increase in diameter of the armored cable. This would result in higher cable water resistance, greater difficulty in storing the cable on the hoist drum and smaller lengths of towline for the same storage drum size.

One method of avoiding this undesirable increase in diameter of the towline is to utilize separate tension and electrical lines. In this case the electrical lines must be flexible or resilient to prevent breakage and unwieldiness.

To minimize the water resistance of the towline, the tension and electrical lines can be enclosed in a fairing. This can be composed of sections which can move with respect to each other or can be a single, continuous structure. It has been found that a greater degree of kiting (swinging of the fish and towline to the side of a fore-and-aft line through the towing vessel) occurs with segmented fairings.

Accordingly, an object of this invention is to provide a minimum-width towline with a minimum of kiting.

Another object is to provide a minimum-width towline with stretchable electrical lines.

A further object is to provide a minimum-width towline with stretchable electrical lines which can be removed and replaced without destroying the towline.

These objects and advantages are provided by a towline in which the communication wiring is stretchable and is located in a cavity within a continuous fairing. The separate tension line is located outside the head of the fairing and individual nose pieces are fitted around the tension line and bolted to the fairing so that a streamlined towline structure is formed.

Other objects and advantages will appear from the following description of an example of the invention, and the novel features will be particularly pointed out in the appended claims.

Figure 1:
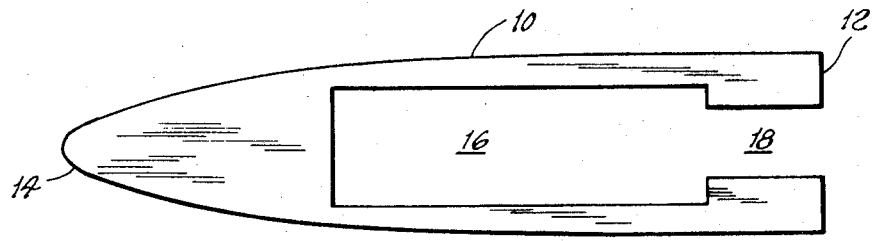
FIG. 1 is a cross-sectional view of the fairing.

The cross-section of the fairing portion of the towline, as seen in FIG. 1, is a bullet shape. The fairing 10 has a head surface 12 (the butt or flat end of the bullet), a tail 14 (the tapered end of the bullet), an internal cavity or module cavity, 16 and a vestibular cavity, or vestibule, 18 running from the head surface 12 to the module cavity 16. The fairing 10 is continuous in length and may be formed from an elastic material such as butyl rubber compound.

Figure 2:
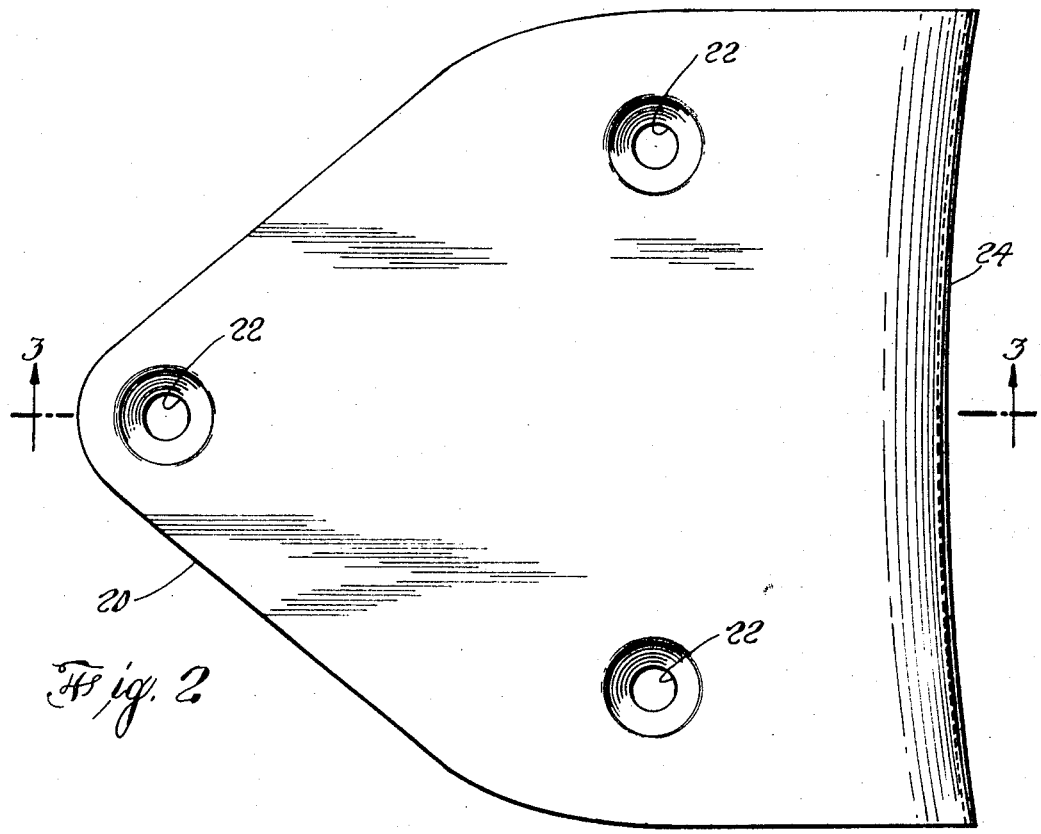
FIG. 2 is a side view of a nose piece.
Figure 3:
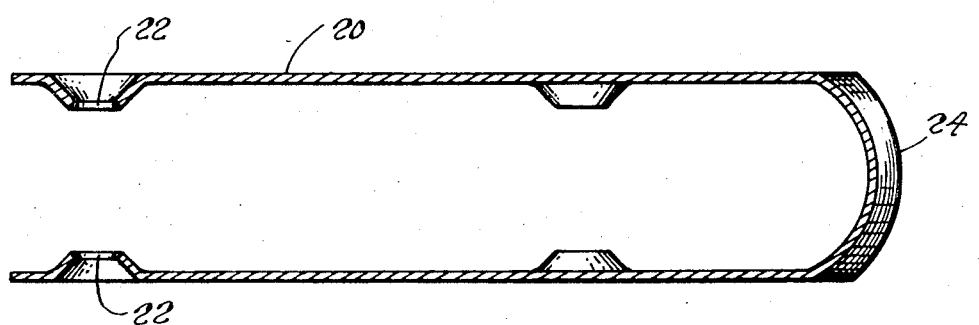
FIG. 3 is a cross-sectional view of a nose piece taken through line 3—3 of FIG. 2.

FIG. 2 shows one of the nose pieces 20 in side view. The side configuration is also somewhat bullet-shaped, one bolt hole 22 being located at the tail and a pair of spaced bolt holes 22 being located in the wide portion of the nose piece 20. The leading edge 24 of the nose piece has a slight convex curve. In cross-sectional view (FIG. 3), the nose piece 20 is substantially U-shaped and it is apparent that the area immediately surrounding each bolt hole 22 is recessed inwardly so that bolt heads will not extend past the outer surface of the nose piece, a condition which preserves the streamlining of the nose piece.

Figure 4:
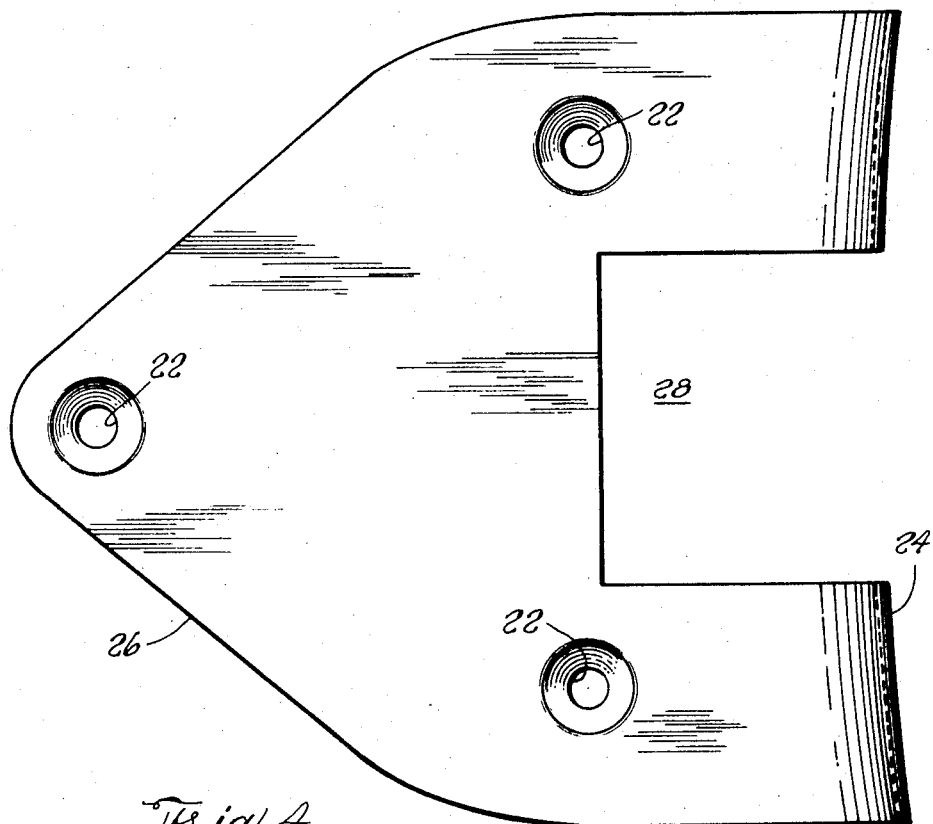
FIG. 4 is a side view of a yoke piece.
Figure 6:
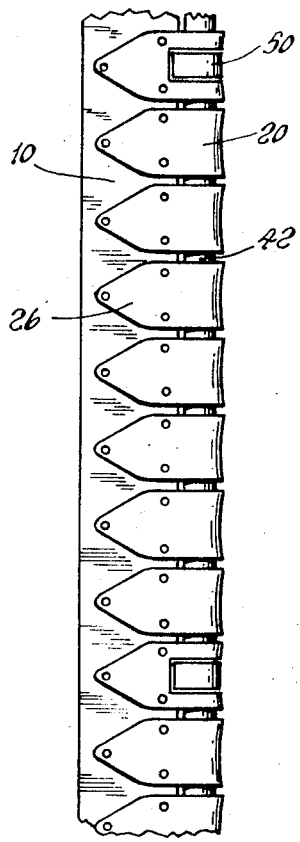
FIG. 6 is a side view of a section of towline.

FIG. 4 shows a yoke piece 26 in side view. The yoke pieces are identical in structure to the nose pieces except that the former have an excision 28 in the central portion extending inwardly from the leading edge 24 for about one-third the breadth of the yoke piece. The excision 28 allows room for the restraining ring 50 which is associated with the yoke piece 26, as explained later in connection with FIG. 6.

Figure 5:
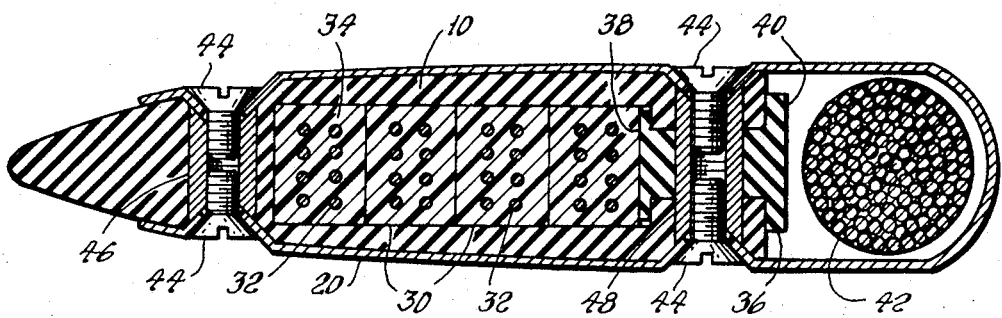
FIG. 5 is a cross-sectional view of the assembled towline taken through the center of a nose piece.

FIG. 5 shows the assembled towline in cross-sectional view taken through the center of a nose piece. Communication modules 30 are placed inside the module cavity 16. In this case, four modules are shown although any number from one upwards can be used depending on the sizes of the modules. Each module 30 is formed from one or more stretchable wires 32 spaced from each other and imbeded in a resilient material 34 which may be made of rubber, for example.

The stretchable wires 32 are a continuous length of wire having an elastic inner core of rubber, for example, which is covered by a cylinder of metallic electrically conductive material such as copper, braided to provide stretchability. An insulative covering may be placed over the braiding although this is not absolutely necessary if the material 34 in which the wires 32 are embedded is electrically insulative.

A fairing spacer 36 is shaped to fit inside the vestibule 18 and has flanges 38 and 40 which abut the shoulder of the module cavity 16 and the head surface 12 of the fairing 10 so that the module cavity 16 is closed when the nose piece 20 is bolted down. The cross-sectional configuration of the spacer 36 is substantially that of the letter H with a thickened cross-bar and with one of the legs (flange 38) smaller than the other (flange 40). The length of the spacer 36 is, of course, the same as that of the fairing 10.

The tension line 42 abuts the leading flange 40 of the spacer 36 and is enclosed by the rounded end of a nose piece 20. The latter is bolted to the fairing 10 by flat-headed bolts 44 which fit into threaded bushings 46 and 48 which, in turn, fit into holes drilled through the fairing 10. The bushings are tubular and have inwardly chamfered surfaces at top and bottom so that the recessed surfaces of the nose pieces 20 surrounding the holes 22 fit against the chamfers.

In a typical embodiment, each eighth nose piece is replaced by a yoke piece 26. The yoke piece 26 bears against and is supported by a restraining ring 50 which envelops and is bonded to the tension line 42. The tension line 42 may typically be a cable formed from a plurality of stainless steel wires as is also the restraining ring 50. A nitrile rubber pad is placed around the tension line 42; the restraining ring 50, a split ring, is clamped over the rubber pad; and then the rubber is vulcanized to the metal. The rings 50 provide support which prevents the fairing from slipping down the tension line while permitting the fairing to swivel around the tension line.

It will be understood that various changes in the details, materials, and arrangements of parts (and steps), which have been herein described and illustrated in order to explain the nature of the invention, may be made by those skilled in the art within the principle and scope of the invention.

What is claimed is:

1. A towline for a body to be positioned underwater while it is being towed by a surface vessel comprising, in combination:
   a fairing comprising a length of resilient material having a substantially bullet-shaped cross-sectional configuration, said fairing being formed, as seen in cross-sectional view, with a central module cavity and a vestibule connecting said central module cavity with the butt-end surface of said fairing;
   a spacer comprising a length of resilient material having a substantially H-shaped cross-sectional configuration, said spacer being inserted within said vestibule so that the vestibular passageway is closed, one flange of said spacer lying outside of an abutting said butt-end surface of said fairing;
   a tension line comprising a length of line of strong material capable of bearing the weight of said towed body and said towline, said tension line being positioned adjacent to the flange of said spacer which lies outside of said butt-end surface;
   a plurality of nose pieces, each comprising a section of rigid material substantially U-shaped in top view and substantially bullet-shaped in side view, each nose piece being placed over said tension line, spacer and fairing so that the curved end of said nose piece is adjacent to and covers said tension line and the tapered end extends back toward the tapered of said fairing, said nose pieces being arranged in a series along the length of said tension line and fairing;
   a plurality of yoke pieces similar in structure to said nose pieces but being formed with a central excision therein extending backward, as seen in side view, from the butt end toward the tapered end of the bullet-shaped configuration;
   a plurality of restraining rings vulcanized to said tension line at spaced intervals corresponding to the longitudinal spacing of a predetermined number of nose pieces, a yoke piece being substituted for a nose piece at each point at which a restraining ring is located so that the restraining ring is located within the central excision of the yoke piece and supports the weight of said yoke piece;
   one or more communications modules, each comprising at least one stretchable, electrically conductive wire embedded in a resilient insulative material, said modules being placed within said module cavity of said fairing; and
   means for fastening said nose and yoke pieces to said fairing in front of and behind said module cavity.

2. A towline as in claim 1, wherein said module cavity is substantially rectangular in cross-section.

3. A towline as in claim 1, wherein said nose and yoke pieces are formed with one or more holes toward the tapered end and also toward the butt end, each hole having an inwardly recessed area surrounding it, and
   said means for fastening said nose and yoke pieces to said fairing include bolts which fit through said holes.

References Cited

UNITED STATES PATENTS 3,379,161   4/1968   Nichols et al.

TRYGVE M. BLIX, Primary Examiner